US008356287B2

(12) United States Patent
Tzoref et al.

(10) Patent No.: US 8,356,287 B2
(45) Date of Patent: Jan. 15, 2013

(54) DEVICE, SYSTEM AND METHOD OF DEBUGGING COMPUTER PROGRAMS

(75) Inventors: Rachel Tzoref, Haifa (IL); Shmuel Ur, Shorashim (IL); Elad Yom-Tov, Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 11/877,689

(22) Filed: Oct. 24, 2007

(65) Prior Publication Data

US 2009/0113399 A1    Apr. 30, 2009

(51) Int. Cl.
 *G06F 9/44*    (2006.01)
(52) U.S. Cl. ......... 717/130; 717/129; 717/131; 717/132
(58) Field of Classification Search .................. None
 See application file for complete search history.

(56) References Cited

U.S. PATENT DOCUMENTS

| | | | | |
|---|---|---|---|---|
| 5,838,976 | A * | 11/1998 | Summers ...................... | 717/130 |
| 6,247,170 | B1 * | 6/2001 | Giroux .......................... | 717/131 |
| 6,543,049 | B1 * | 4/2003 | Bates et al. ................... | 717/129 |
| 6,792,595 | B1 * | 9/2004 | Storistenau et al. .......... | 717/110 |
| 7,082,599 | B1 * | 7/2006 | Morganelli et al. ........... | 717/132 |
| 7,216,341 | B2 | 5/2007 | Guarraci | |
| 7,299,452 | B1 * | 11/2007 | Zhang et al. ................... | 717/124 |
| 7,493,630 | B2 * | 2/2009 | Hunt ............................. | 719/330 |
| 7,543,279 | B2 * | 6/2009 | Ayers et al. ................... | 717/135 |
| 7,574,697 | B2 * | 8/2009 | Biberstein et al. ............. | 717/130 |
| 7,698,692 | B1 * | 4/2010 | Garud et al. .................. | 717/130 |
| 8,095,917 | B2 * | 1/2012 | Stall ............................. | 717/130 |
| 2002/0104074 | A1 * | 8/2002 | Hundt et al. ................... | 717/129 |
| 2004/0216092 | A1 * | 10/2004 | Ayers et al. .................... | 717/135 |
| 2004/0230961 | A1 * | 11/2004 | Biberstein et al. ............. | 717/150 |
| 2005/0071821 | A1 * | 3/2005 | Levine et al. .................. | 717/130 |
| 2005/0289499 | A1 * | 12/2005 | Ogawa et al. .................. | 716/18 |
| 2006/0123384 | A1 * | 6/2006 | Nickell et al. ................. | 717/100 |
| 2006/0265694 | A1 * | 11/2006 | Chilimbi et al. ............... | 717/124 |
| 2008/0082968 | A1 * | 4/2008 | Chang et al. ................... | 717/128 |
| 2008/0127116 | A1 * | 5/2008 | Kosche et al. ................. | 717/130 |
| 2008/0168428 | A1 * | 7/2008 | Bates et al. .................... | 717/129 |
| 2008/0244536 | A1 * | 10/2008 | Farchi et al. ................... | 717/130 |
| 2008/0301649 | A1 * | 12/2008 | Stall .............................. | 717/134 |

OTHER PUBLICATIONS

Chao Liu, "Statistical Debugging: A Hypothesis Testing-Based Approach", IEEE Oct. 2006, pp. 831-846, <http://ieeexplore.ieee.org/stamp/stamp.jsp?tp=&arnumber=1717474>.*
J. M. Voas, "Software Testability Measurement for Assertion Placement and Fault Localization", 1995, 12 pages, <http://bluecoat-01>.*
Alice X. Zheng et al, "Statistical Debugging: Simultaneous Identification of Multiple Bugs", Proceedings of the 23 rd International Conference on Machine Learning, Pittsburgh, PA, 2006, pp. 1105-1112, <http://dl.acm.org/citation.cfm?id=1143983>.*
Chao Liu et al, "How Bayesians Debug", 2006 IEEE, 12 pages, <http://ieeexplore.ieee.org/stamp/stamp.jsp?tp=&arnumber=4053065>.*
Tai-Yi Huang et al, "Automated Fault Localization with Statistically Suspicious Program States", Jun. 2007 ACM, pp. 11-19, <http://dl.acm.org/citation.cfm?id=1254766.1254769>.*

(Continued)

*Primary Examiner* — Thuy Dao
*Assistant Examiner* — Cuong V Luu (57) ABSTRACT

Device, system, and method of debugging computer programs. For example, a method for debugging computer programs includes: locating a bug in a computer program based on a first score corresponding to a first instrumentation location of the computer program and a second score corresponding to a second instrumentation location of the computer program.

18 Claims, 4 Drawing Sheets

OTHER PUBLICATIONS

James A. Jones et al, "Debugging in Parallel", pp. 17-26, Jul. 2007 ACM, <http://dl.acm.org/citation.cfm?id=1273463.1273468&coll=DL>.*

V. Mirgorodskiy et al., "Problem Diagnosis in Large-scale computing environments", Source: ftp://ftp.cs.wisc.edu/paradyn/papers/Mirgorodskiy06ProblemDiagnosis.pdf, Published in Nov. 2006 13 pages.

Y. Eytani et al., "Heuristics for finding concurrent bugs", Parallel and distributed processing symposium, 2003 Proceedings, 8 pages.

* cited by examiner

DEVICE, SYSTEM AND METHOD OF DEBUGGING COMPUTER PROGRAMS

FIELD

Some embodiments of the invention are related to the field of computer programming, and more particularly to debugging of computer programs.

BACKGROUND

Debugging is a process of finding and correcting errors ("bugs") in a computer program, in order to make the computer program behave as expected. Debugging may require efforts and significant time from a programmer. It may be particularly difficult to find concurrent bugs, for example, unintentional race conditions or deadlocks, which may exist in multi-threaded computer programs.

A "delta debugging" algorithm may be used for locating some bugs. The algorithm receives a set of program changes that appear to induce a bug, and searches for a minimal subset of the program that still induces the bug. A delta debugging algorithm assumes that the bug is monotonic, namely, exists in all supersets of the received set of program changes; unfortunately, this assumption may not hold true for many concurrent bugs.

A "tarantula" fault-localization technique computes rankings of code statements, based on their likelihood ("suspiciousness") to contribute to failed runs of the computer program. Unfortunately, this technique, which analyzes code at a statement level, may not find bugs associated with the concurrent domain. Furthermore, the programmer is required to independently (e.g., manually) sample the program in order to apply this technique.

Similarly, a "GeneticFinder" debugging algorithm analyzes code at a statement level, and may not find bugs associated with the concurrent domain. Furthermore, this algorithm uses extensive (e.g., complete) instrumentation of the program, which in turn may change the scheduling of one or more program portions and may thus further reduce the probability of finding concurrent bugs.

A statistical debugging method may be used to identify probable bug locations in single-thread programs. Unfortunately, this method includes instrumentation by manual insertion of assertions into program code, and this may be effort-consuming and time-consuming, particularly in large programs. Additionally, a significant number of program runs, and/or a diverse sample of programs runs, may be required in order to execute all the placed assertions. Furthermore, this debugging method may require manual tuning of parameters of a classifier which attempts to predict the outcome of program runs (namely, success or failure) based on the outcomes of the assertions.

A runtime algorithm, for example, a race detector, may be used to identify probable bug locations. Unfortunately, the runtime algorithm may generate numerous "false alarms"; and may require extensive (e.g., complete) instrumentation of the program, which in turn may change the scheduling of one or more program portions and may thus further reduce the probability of finding concurrent bugs.

SUMMARY

Some embodiments of the invention include, for example, devices, systems, and methods of debugging computer programs.

In some embodiments, a method for debugging computer programs includes: locating a bug in a computer program based on a first score corresponding to a first instrumentation location of the computer program and a second score corresponding to a second instrumentation location of the computer program.

In some embodiments, the first score indicates an estimated probability that the first program location induces the program bug, and the second score indicates an estimated probability that the second program location induces the program bug.

In some embodiments, the method includes: calculating the first score by running the computer program a plurality of runs with partial instrumentation at the first instrumentation location, and dividing the number of runs in which the computer bug was revealed by the number of runs in which the computer bug was not revealed.

In some embodiments, locating the bug includes: calculating an absolute value of a difference between the first score and the second score.

In some embodiments, locating the bug includes: calculating a plurality of score differences corresponding respectively to a plurality of pairs of consecutive instrumentation locations.

In some embodiments, the method includes: selectively displaying one or more score differences having the greatest absolute values.

In some embodiments, locating the bug includes: determining one or more score differences that are significant to localizing the program bug; and selectively displaying the one or more score differences in proximity to edges of a control flow graph corresponding to a flow of the computer program.

In some embodiments, the method includes: generating a control flow graph corresponding to a flow of the computer program; and selectively displaying one or more score differences associated with one or more edges of the flow control graph.

In some embodiments, the method includes: receiving a user selection of one of the edges of the control flow graph, the one of the edges having an entry node and an exit node; and displaying a program portion starting at a program location corresponding to the entry node and ending at a program location corresponding to the exit node.

In some embodiments, a system for debugging computer programs includes a debugger to locate a bug in a computer program based on a first score corresponding to a first instrumentation location of the computer program and a second score corresponding to a second instrumentation location of the computer program.

In some embodiments, the first score indicates an estimated probability that the first program location induces the program bug, and the second score indicates an estimated probability that the second program location induces the program bug.

In some embodiments, the debugger is to calculate the first score by running the computer program a plurality of runs with partial instrumentation at the first instrumentation location, and dividing the number of runs in which the computer bug was revealed by the number of runs in which the computer bug was not revealed.

In some embodiments, the debugger is to calculate an absolute value of a difference between the first score and the second score.

In some embodiments, the debugger is to calculate a plurality of score differences corresponding respectively to a plurality of pairs of consecutive instrumentation locations.

In some embodiments, the debugger is to selectively display one or more score differences having the greatest absolute values.

In some embodiments, the debugger is to determine one or more score differences that are significant to localizing the program bug, and to selectively display the one or more score differences in proximity to edges of a control flow graph corresponding to a flow of the computer program.

In some embodiments, the debugger is to generate a control flow graph corresponding to a flow of the computer program, and to selectively display one or more score differences associated with one or more edges of the flow control graph.

In some embodiments, the debugger is to receive a user selection of one of the edges of the control flow graph, the one of the edges having an entry node and an exit node, and to display a program portion starting at a program location corresponding to the entry node and ending at a program location corresponding to the exit node.

Some embodiments include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired and/or wireless links, may utilize one or more components of wireless communication, and may utilize one or more methods or protocols of wireless communication. Some embodiments of the invention may utilize wired communication and/or wireless communication.

The terms "program" "computer program" or "code" as used herein include, for example, a source code, a computer program, a code or program written in a high-level programming language, a code or program written in a very high-level programming language, a code or program written in a low-level programming language, an assembly code or program, a machine language code or program, a single-thread program, a multiple-thread program, a portion of a code or program, a segment of a code or program, one or more instructions or sets of instructions, one or more subroutines, one or more procedures, one or more functions, one or more libraries, a logic, an object-oriented code or program, a portable or non-portable code or program, a code or program that requires compilation by a compiler, an originally-written code or program, a non-optimized code or program, an optimized code or program, a non-modified program, a modified program, a debugged program, a non-debugged program, a pre-compilation program version, a post-compilation program version, a pre-optimization program version, a post-optimization program version, a pre-linking program version, a post-linking program version, a program that was modified manually by a programmer, a program that was modified automatically by a compiler and/or linker and/or debugger and/or optimizer, a program that was subject to one or more iterations of optimization, a program that was subject to one or more methods of optimization, or the like.

The terms "bug" or "fault" or "error" as used herein may include, for example, defect, flaw, mistake, failure, misbehavior, non-behavior, or other type of error or fault in a computer program; an error that prevents the program from behaving as intended; an error that causes the computer program to produce an incorrect result or an unintended result; a syntax error; a typing error or a typo; a logic error; a design error; input errors; output errors; operation errors; a set of consecutive or non-consecutive errors; a source code error; an error produced by a module (e.g., a compiler, a linker, an optimizer or the like) producing incorrect code; an error that interferes with functionality of the program; an error that produces or causes an unintended behavior or unintended feature; an error that causes the program to stop running, to "crash" the program or another program (e.g., the Operating System), to "freeze" the program or another program (e.g., the Operating System); an error that causes the program to perform an infinite loop, to become "stuck", or to significantly slow down its operation; an error that causes one or more threads of a multi-thread program to behave in an unintended manner or to produce an unintended result; an error that causes the program to consume resources (e.g., processing resources, memory resources, storage resources, or the like) that are not allocated or are not intended for consumption by the program; concurrent bugs; non-concurrent bugs; performance of an operation that is not intended to be performed; non-performance of an operations that is intended to be performed; and/or other types of errors.

The terms "concurrent bug" or "concurrent error" as used herein include, for example, a bug or error that is able to occur in a first timing or scheduling, and is unable to occur in a second, different, timing or scheduling; a bug or error that can be exposed or detected in a first timing or scheduling, and cannot be exposed or detected in a second, different, timing or scheduling; a bug or error that can be elicited in a first timing or scheduling, and cannot be elicited in a second, different, timing or scheduling; a bug or error that can be exposed in a first timing or scheduling, and cannot be exposed in a second, different, timing or scheduling; a bug or error that can occur, or can be exposed or detected or elicited, based (at least in part) on program timing, program scheduling, thread timing, or thread scheduling; and/or a bug or error that can occur, or can be exposed or detected or elicited, based (at least in part) on occurrence or non-occurrence of one or more concurrent events or conditions, or based (at least in part) on performance or non-performance of one or more concurrent (or substantially concurrent or partially concurrent) operations or threads.

The term "concurrent" as used herein includes, for example, simultaneous, substantially simultaneous, synchronized, co-existing, parallel, contemporaneous, at least partially simultaneous, at least partially concurrent, at least partially in parallel, occurring in a time period that at least partially overlaps with occurrence of another event, or the like.

Although portions of the discussion herein relate, for demonstrative purposes, to identification and/or localization of concurrent bugs, some embodiments of the invention may be used in conjunction with identifying and/or localizing concurrent bugs and/or non-concurrent bugs.

The terms "derivative" or "derivative formula" or "derivative function" or "derivative calculation" as used herein include, for example, a formula or function that calculate differences between two points or two scores; a formula or function that calculate differences between two consecutive points or two consecutive scores; a formula or function that calculate absolute values of differences between two points or two scores; a formula or function that calculate absolute values of differences between two consecutive points or two consecutive scores; a formula or function that utilize two or more points, or two or more consecutive points, or two or more scores, or two or more consecutive scores; a formula or function that utilize a pair of scores, a pair of consecutive scores, a pair of points, a pair of consecutive points, pairs of points, or pairs or scores; or other suitable formula or function that measure or trace modifications among scores or points.

At an overview, some embodiments of the invention automatically pinpoint the location of concurrent bugs in a multi-threaded computer program under test. Accordingly, a debugging tool is able to automatically pinpoint the exact program location or code portion that includes a concurrent bug, given a concurrent test that can find the existence of the concurrent bug. The debugger is thus able to generate output indicating to a programmer the program location that includes a concurrent bug.

In some embodiments, a method for finding the code location of concurrent bugs includes the following operations. First, the method finds a test that can reveal the bug, e.g., using timing instrumentation. Then, substantially each instrumentation is scored or ranked based on its likelihood to be useful in finding the bug. This is performed, for example, by repeated execution using partial instrumentations. A score is calculated, for example, by dividing the probability (or the number of runs) that the program location contributed to or induced the bug, by the probability (or the number of runs) that the program location did not contribute to or did not induce the bug. Upon calculation of scores, edges in the program control flow are associated with score differences, according to the difference in score of the specific features at the entry node and the exit node of the relevant edge. Subsequently, the debugger tool displays to the programmer the edges that are associated with score difference(s) having the greatest absolute value(s).

In some embodiments, the computer program is instrumented by insertion of schedule-modifying statements ("noise"), for example, sleep or yield statements, at instrumentation points. The instrumentation points include program locations that are "interesting" or possibly relevant for locating concurrent bugs, for example, program locations that access a shared variable, program locations that access or acquire a shared resource or a protected resource, program locations that access or attempt to access a resource that they are unauthorized to access or to which they have a limited access, entrance(s) to synchronized block(s), or exit(s) from a synchronized block(s).

In accordance with some embodiments of the invention, a debugger tool computes a score or ranking for substantially each possible instrumentation point of the computer program. The score indicates the correlation between the instrumentation point and a program successful execution ratio, for example, the ratio of program runs in which a bug was revealed to program runs in which a bug was not revealed. Optionally, the score calculation is based on a feature selection algorithm from the domain of machine learning.

Upon calculation of scores, a control flow graph of the computer program is generated and analyzed. For example, substantially each node of the control flow graph is marked or tagged with the score of the corresponding instrumentation point. Then, a derivative of the score along the control flow graph is calculated and analyzed. For example, for substantially each edge or line of the control flow graph, the difference between the score at the entry node and the score at the exit node is calculated. Edges of the control graph are sorted, filtered and/or displayed to the programmer based on the absolute value of their entry/exit score difference, namely, the increase or decrease in two adjacent node scores. For example, maximal differences of node scores may correspond to program locations that are suspected to be a root cause of bug. Embodiments of the invention may perform other analysis to derivatives or differences between node scores.

In accordance with some embodiments of the invention, if a bug is easily detectable using noise injection (namely, if the bug is found by utilizing multiple subsets of instrumentation points), then analyzing the absolute values of scores of instrumentation points may be insufficient. For example, there is no sufficiently high correlation between bug locations and instrumentation points associated with high node scores, since multiple or numerous points in the program may induce the bug, including points that are remote from the bug location. In contrast, particularly for localization of concurrent bugs, generating and analyzing a derivative of node scores along the program execution path may differentiate the instrumentation points in the vicinity of the bug location from other instrumentation points. This may be achieved, for example, since many consecutive instrumentation points in the program have a similar effect on inducing the bug, except for the instrumentation points that are actually correlated to the root cause of the bug.

Some embodiments of the invention thus utilize an analysis of a derivative of node scores in order to localize bugs, concurrent bugs, non-concurrent bugs, rare bugs, and/or bugs that are typically difficult to find using instrumentation.

Figure 1:
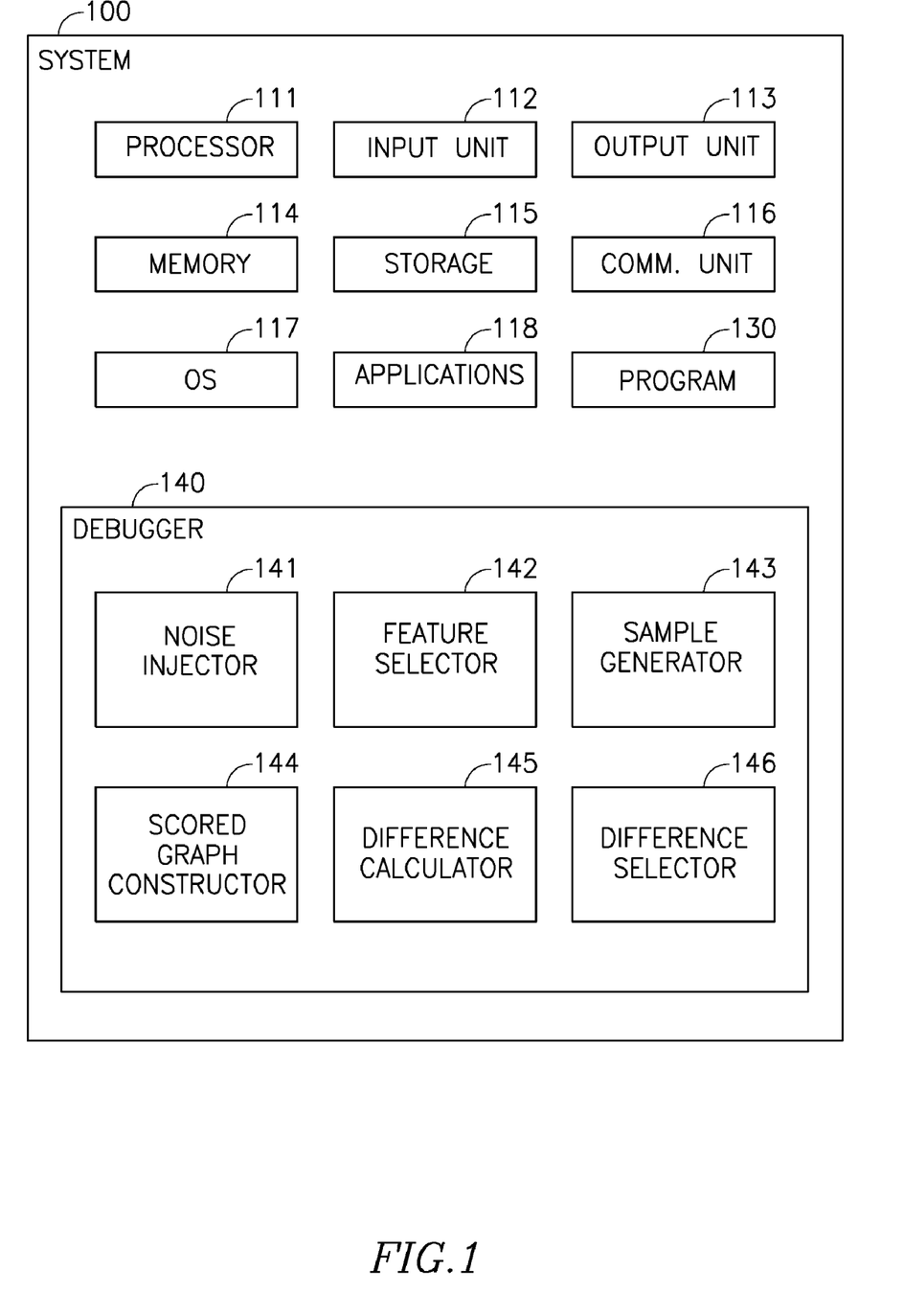
FIG. 1 is a schematic block diagram illustration of a system for debugging computer programs in accordance with a demonstrative embodiment of the invention.

FIG. 1 schematically illustrates a block diagram of a system 100 for debugging computer programs in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 includes, for example, a processor 111, an input unit 112, an output unit 113, a memory unit 114, a storage unit 115, and a communication unit 116. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 117 of system 100 or of one or more software applications 118.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by system 100.

Communication unit 116 includes, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 includes, or is associated with, one or more antennas, for example, a dipole antenna, a monopole antenna, an omni-directional antenna, an end fed antenna, a circularly polarized antenna, a micro-strip antenna, a diversity antenna, or the like.

In some embodiments, the components of system 100 may be enclosed in a common housing or packaging, and may be interconnected or operably associated using one or more wired or wireless links. In other embodiments, components of system 100 may be distributed among multiple or separate devices or locations, may be implemented using a client/server configuration, may communicate using remote access methods, or the like.

System 100 includes a program 130 under test or under debugging. Program 130 may be, for example, a source code originally written or composed by a programmer, or downloaded or copied from a third party, or otherwise obtained or created. Program 130 may include, for example, source code written in a high-level programming language.

System 100 further includes a debugger 140, for example, a software module and/or hardware component able to test, examine and/or debug the program 130. Debugger 140 includes, for example, a noise injector 141, a feature selector 142, a sample generator 143, a scored graph constructor 144, a difference calculator 145, and a difference selector 146.

Noise injector 141 is able to perform instrumentation by inserting schedule-modifying statements ("noise"), for example, sleep or yield statements, at a subset of instrumentation points of program 130. Noise injector 141 includes, for example, a test generation tool for multi-threaded programs that is based on noise insertion. Noise injector 141 further supports instrumenting and running the program 130 with substantially any given subset of instrumentation points.

In some embodiments, for example, noise injector 141 includes features and/or functionality similar to ConTest, a multi-threaded Java program test generator for testing and measuring the coverage of concurrent Java programs, available from International Business Machines Corporation. For example, program 130 is seeded by noise injector 141 with a sleep( ), yield( ), or priority( ) primitive at shared memory accesses and synchronization events. At run time, noise injector 141 is able to make pseudo-random or coverage-based decisions as to whether or not the seeded primitive is to be executed.

The instrumentation and noise injection modifies or transforms class files, for example, by injecting calls to noise injector 141 runtime functions at selected locations of program 130. The selected instrumentation locations include program locations whose relative order among the threads may impact the result, or program locations that are "interesting" or possibly relevant for locating bugs or concurrent bugs; for example, program locations that access a shared variable, program locations that access or acquire a shared resource or a protected resource, program locations that access or attempt to access a resource that they are unauthorized to access or to which they have a limited access, entrance(s) to synchronized block(s), or exit(s) from a synchronized block(s).

In some embodiments, noise injector 141 is able to extract the set of substantially all the program 130 locations to which noise may be added, and to selectively instrument and run the program 130 with a given subset of instrumentation locations.

At runtime, noise injector 141 may cause, or may attempt to cause, context switches in these program locations. Context switches are attempted by calling a suitable method, for example, yield( ) or sleep( ). In some embodiments, noise injector 141 utilizes pseudo-random determinations so that different interleavings are attempted at different program runs. Optionally, heuristics may be used to reveal typical bugs. In some embodiments, noise injector 141 does not generate "false alarms", since substantially all interleavings that occur are in accordance with pre-defined rules (e.g., Java Virtual Machine (JVM) rules).

Feature selector 142 is able to perform a process of finding a minimal subset of indicators that best represent the data. "Noisy" or "irrelevant" features (indicators) may be detrimental to pattern recognition, since they impede generalization, increase computational complexity, and require numerous training samples in order to reach a given accuracy. With regard to a non-monotonic program, "noisy" or "irrelevant" features may mask the bug, or may cause the bug to appear with a low probability, thereby requiring numerous runs of the program (e.g., hundreds or thousands of runs) to elicit or expose the bug.

In some embodiments, particularly with regard to small feature sets, feature selector 142 may use a "brute force" process, by trying substantially all possible feature combinations. In other embodiments, other feature selection methods may be used. For example, testing substantially all the possible combinations for approximately 100 features may require testing of approximately 10^30 configurations; whereas utilization of approximately 100 instrumentation points is faster and may be appropriate, for example, for medium-sized programs. Accordingly, feature selector 142 may utilize one or more feature selection methods, based on properties of the program 130, for example, based on the program size, based on the number of expected features or instrumentation points, based on the estimated number of features combinations, or the like.

Feature selector 142 may utilize, for example, feature selection methods of one or more of the following classes: wrapper methods, in which feature selection is performed around (and with) a given classification algorithm; embedded methods, in which feature selection is embedded within a classification algorithm; and/or filter methods, in which features are selected for classification independently of the classification algorithm.

In some embodiments, for example, feature selector 142 applies a filter method for selecting the most relevant features in the sample. This allows, for example, small or minimal dependency between the feature selection stage and other stages of the debugging process.

Feature selector 142 may operate in conjunction with sample generator 143 able to actively manipulate the program 130 in order to best elicit its different modes of behavior, e.g., utilizing Design of Experiments (DOE) methods. Some embodiments use, for example, D-optimal design, namely, a method which maximizes Fisher's information matrix.

For example, in some embodiments, program 130 can be instrumented in N points and run for M experiments. Let X denote a matrix of size N×M, where x_{ij}=1 if and only if the j-th experiment was instrumented in point i. Accordingly, a D-optimal design maximizes the determinant of X:|X':X|. In some embodiments, finding X which maximizes |X':X| may be a computationally difficult task. Therefore, in some embodiments, numerous instances (e.g., 500 instances) of a random sampling matrix X are created, and the matrix that has the largest |X':X| is selected therefrom. The selected sampling matrix is then used as the input for running the program 130. After running the program 130 with the given sampling matrix, each sample is marked as successful (the bug was found) or unsuccessful (the bug was not found).

Feature selector 142 utilizes a score to each of the instrumentation points, indicating the likelihood of the instrumentation point to induce the bug. A likelihood ratio test scoring function is used in order to score the features. For example, let $P(Success|X\_i)$ denote the sample probability that tests which instrumented the i-th instrumentation point will result in a bug; and let $P(!Success|X\_i)$ denote the sample probability that tests which instrumented the i-th instrumentation point will not result in a bug. The score for each instrumentation point may be calculated using a formula that takes into account $P(Success|X\_i)$ and/or $P(!Success|X\_i)$. For example, in some embodiments, the score may be calculated using the following equation, denoted Equation 1:

$$\text{Score}(i) = P(\text{Success}|X\_i)/P(!\text{Success}|X\_i) \qquad \text{Equation 1}$$

The scored graph constructor 144 is able to construct a control flow graph of the program 130 which includes score indications. Optionally, an approximation of the control flow graph of the program 130 may be produced based on a graph induced by the concurrent event pairs coverage, e.g., generated by noise injector 141 or the ConTest tool. For example, such a graph is produced based on a list of pairs of concurrent event program locations that appeared consecutively in a run, as well as thread-related information, namely, whether or not pairs of concurrent events were performed by the same thread.

In some embodiments, the program 130 is run several times (e.g., using the noise injector 141 or the ConTest tool) to induce different interleavings. Then, scored graph constructor 144 constructs the scored control flow graph from the pairs of program locations that were executed by the same thread. For example, each node in the graph represents an instrumentation point of the program 130; there exists a directed edge from node "a" to node "b" if and only if the pair of instrumentation points ("a" and "b") appears in the concurrent event coverage produced by noise injector 141 or by the ConTest tool, namely, the concurrent events in points "a" and "b" were executed consecutively by a thread in program 130.

Accordingly, upon calculation of scores, a control flow graph of program 130 is generated and analyzed. For example, substantially each node of the control flow graph is marked or tagged with the score of the corresponding instrumentation point. Then, a derivative of the score along the control flow graph is calculated and analyzed. For example, for substantially each edge or line of the control flow graph, the difference between the score at the entry node and the score at the exit node is calculated, for example, by difference calculator 145. Edges of the control graph are sorted, filtered and/or displayed to the programmer (e.g., utilizing a user interface) based on the absolute value of their entry/exit score difference, namely, the increase or decrease in two adjacent node scores. For example, maximal differences of node scores may correspond to program locations that are suspected to be a root cause of bug.

Optionally, difference selector 146 automatically selects one or more differences of node scores to be presented to the programmer, to be outputted by debugger 140, or to be emphasized or otherwise highlighted to the programmer. In some embodiments, difference selector 146 selects the K differences of node scores having the largest absolute value(s), wherein K is a relatively small natural number (e.g., three, seven, ten, or the like). In some embodiments, difference selector 146 selects the top R percent of the differences of node scores having the largest absolute value(s), wherein R is a relatively small natural number (e.g., selection of the top five percent of the differences). In some embodiments, optionally, K or R may be pre-defined, or may be set or modified by the programmer.

In some embodiments, debugger 140 utilizes selective instrumentation, partial instrumentation or light instrumentation or program 130, for example, only of program locations whose relative order among the threads may impact the result, or only of program locations that are "interesting" or possibly relevant for locating bugs or concurrent bugs. This may allow, for example, reduced modification of the scheduling of one or more program portions and may thus increase the probability of finding concurrent bugs. This may be in contrast with some conventional debuggers, which may perform substantially complete instrumentation of substantially all statements of program 130, or an extensive instrumentation thereof.

In some embodiments, debugger 140 does not assume that a bug is monotonic, namely, exists in all supersets of the received set of program changes. This may be in contrast with some conventional debuggers, which may assume that a bug is monotonic.

In some embodiments, debugger 140 selectively generates scores to selected program locations or to selected instrumentation points, and may avoid generating a score to a program location which is remote from the bug location. This may be in contrast with some conventional debuggers, which may generate a "suspiciousness" ranking to substantially each statement or line of program 130, including to program locations that are remote from the bug location.

In some embodiments, debugger 140 automatically performs program sampling (e.g., using sample generator 143), for example, automatic sampling of instrumentation points in the concurrent domain. In contrast, in some conventional debugging methods, the programmer may be required to independently (e.g., manually) sample the program in order to apply a debugging method.

In some embodiments, debugger 140 determines prior to run-time or not during run-time in which program locations to perform instrumentation. In contrast, some conventional debuggers may determine only during run-time whether or not to inject "noise", or at which program locations to inject "noise".

In some embodiments, the output of system 100 is displayed using a display unit (e.g., output unit 113). Optionally, the user (e.g., a programmer) may selectively interact with portions of the output using an interface (e.g., input unit 114), for example, in order to select an edge or a score difference, to select a node or a score, to switch between nodes and corresponding program locations, to switch between edges and corresponding code portions, or the like.

Figure 2:
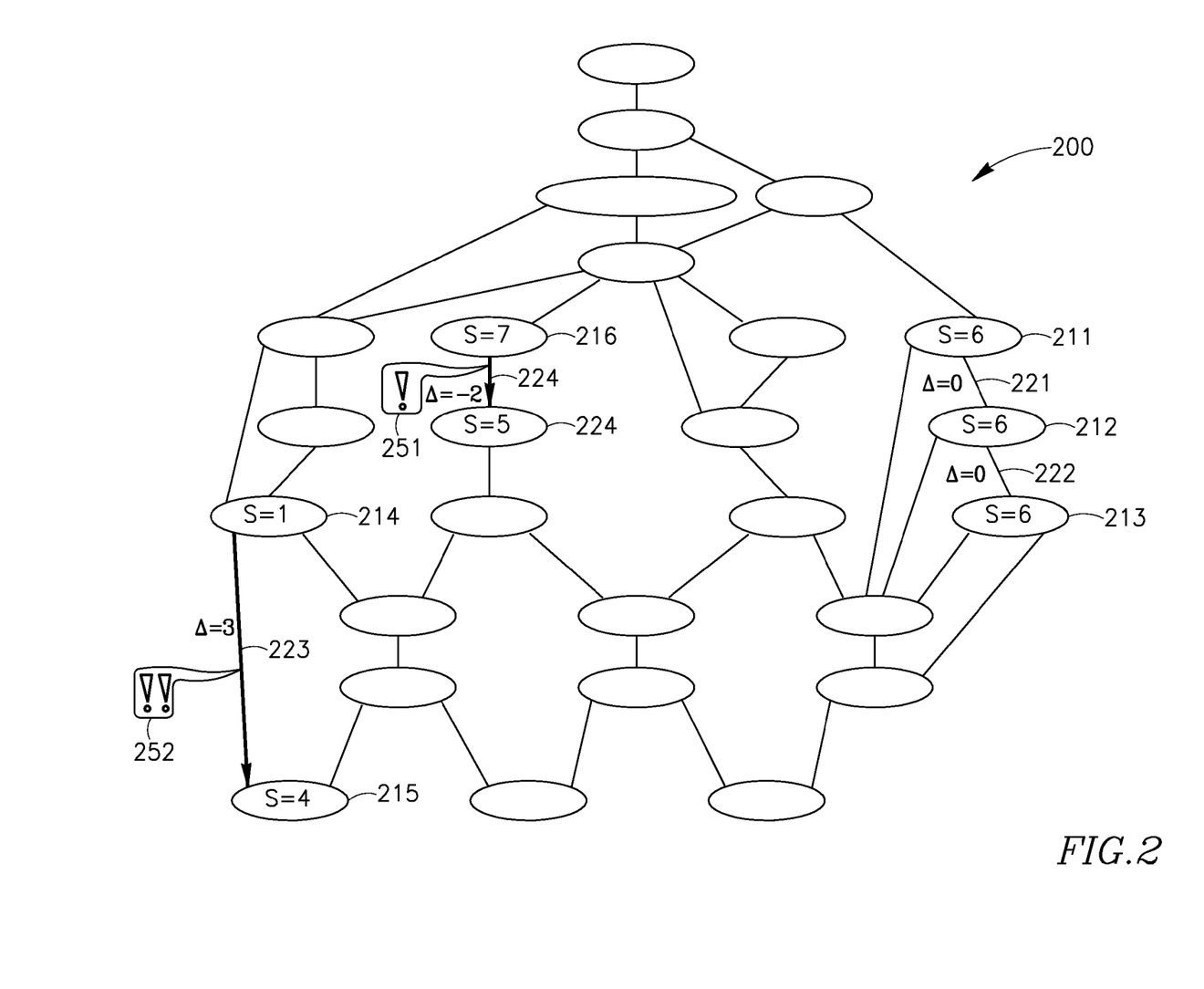
FIG. 2 is a schematic illustration of a control flow graph generated in accordance with a demonstrative embodiment of the invention.

FIG. 2 schematically illustrates a control flow graph 200 generated in accordance with some demonstrative embodiments of the invention. Control flow graph 200 may be generated, for example, by system 100 of FIG. 1, by debugger 140 of FIG. 1, and/or by other suitable units, devices and/or systems.

Control flow graph 200 includes representations of multiple nodes, for example, nodes 211-217, corresponding to instrumentation points or program locations. Control flow graph 200 further includes representation of multiple edges, for example, edges 221-224; an edge corresponds to a portion of the program code that begins at a first node ("entry node") and ends at a second node ("exit node").

Some or all of the nodes 211-217 are associated with scores. For example, a score of 6 is associated with node 211; a score of 6 is associated with node 212; a score of 6 is associated with node 213; a score of 6 is associated with node 212; a score of 1 is associated with node 214; a score of 4 is associated with node 215; a score of 7 is associated with node 216; and a score of 5 is associated with node 217.

Accordingly, a score difference of zero is associated with edge 221; a score difference of zero is associated with edge 222; a score difference of 3 is associated with edge 223; and a score difference of −2 is associated with edge 224.

Scores of nodes, and/or score differences of edges, may be displayed, for example, in proximity to the corresponding node or edge, upon selecting a corresponding node or edge (e.g., using a graphical user interface), upon hovering with a cursor or pointer over a node or edge, or the like.

In some embodiments, the score difference of zero, associated with edge 221, as well as the score difference of zero, associated with edge 222, are automatically determined (e.g., by the debugger) to be insignificant for locating bugs. Accordingly, the score differences of edge 221 and edge 222 are not displayed, or are hidden. Additionally or alternatively, the scores of nodes 211, 212 and 213 are not displayed, or are hidden.

In contrast, the score difference of 3, associated with edge 223, as well as the score difference of −2 (having an absolute value of 2), associated with edge 224, are automatically determined (e.g., by the debugger) to be significant for locating bugs. Accordingly, the score differences or edge 223 and 224 are displayed; optionally, edges 223 and 224 are highlighted or otherwise visually emphasized; and optionally, the scores of nodes 214-217 are displayed.

Control flow graph 200 may be displayed in conjunction with an interactive user interface. For example, the interface allows the programmer to command the debugger to display all score differences; to display only the score differences having the greatest absolute value; to display the K score differences having the greatest absolute value(s), wherein K is a natural number; or the like. Optionally, in response to a user selection of an edge in the control flow graph 200, the debugger displays to the programmer the code portion that corresponds to the selected edge. Optionally, in response to a user selection of a node in the control flow graph 200, the debugger displays to the programmer the code location that corresponds to the selected edge.

In some embodiments, edges 223 and 224 may be highlighted or emphasized using a tag or annotation to rapidly convey to the programmer a message, for example, "Bug located here". For example, an alert annotation 251 is displayed in proximity to edge 224, and an alert annotation 252 is displayed in proximity to edge 223. Optionally, the content of alert annotations 251-252 may vary based on the score difference associated with the corresponding edge. For example, since the absolute value of the score difference of edge 224 (namely, three) is greater than the absolute value of the score difference of edge 223 (namely, two), the edge 224 may be annotated or displayed using a greater emphasis or a higher level of alert than those of edge 223; for example, edge 223 is annotated with an alert message of "!!", whereas edge 224 is annotated with an alert message of "!". Other suitable display mechanisms may be used.

Although the control flow graph 200 shows, for demonstrative purposes, score values displayed in proximity to nodes, embodiments of the invention may utilize other presentation methods; for example, in some embodiments, score values are not displayed at all, or insignificant score values are not displayed whereas significant score values are displayed.

Although the control flow graph 200 shows, for demonstrative purposes, score differences displayed in proximity to edges, embodiments of the invention may utilize other presentation methods; for example, in some embodiments, score differences are not displayed at all, or insignificant score differences not displayed whereas significant score differences are displayed.

Although the control flow graph 200 shows, for demonstrative purposes, score values that are integer numbers and score differences that are integer numbers, embodiments of the invention are not limited in this regard. For example, score values may have integer values or non-integer values or zero values; and score differences may have integer values and/or non-integer values or zero values. In some embodiments, a score value may be a positive number or zero; and a score difference may be a positive number, a negative number, or zero.

Figure 3:
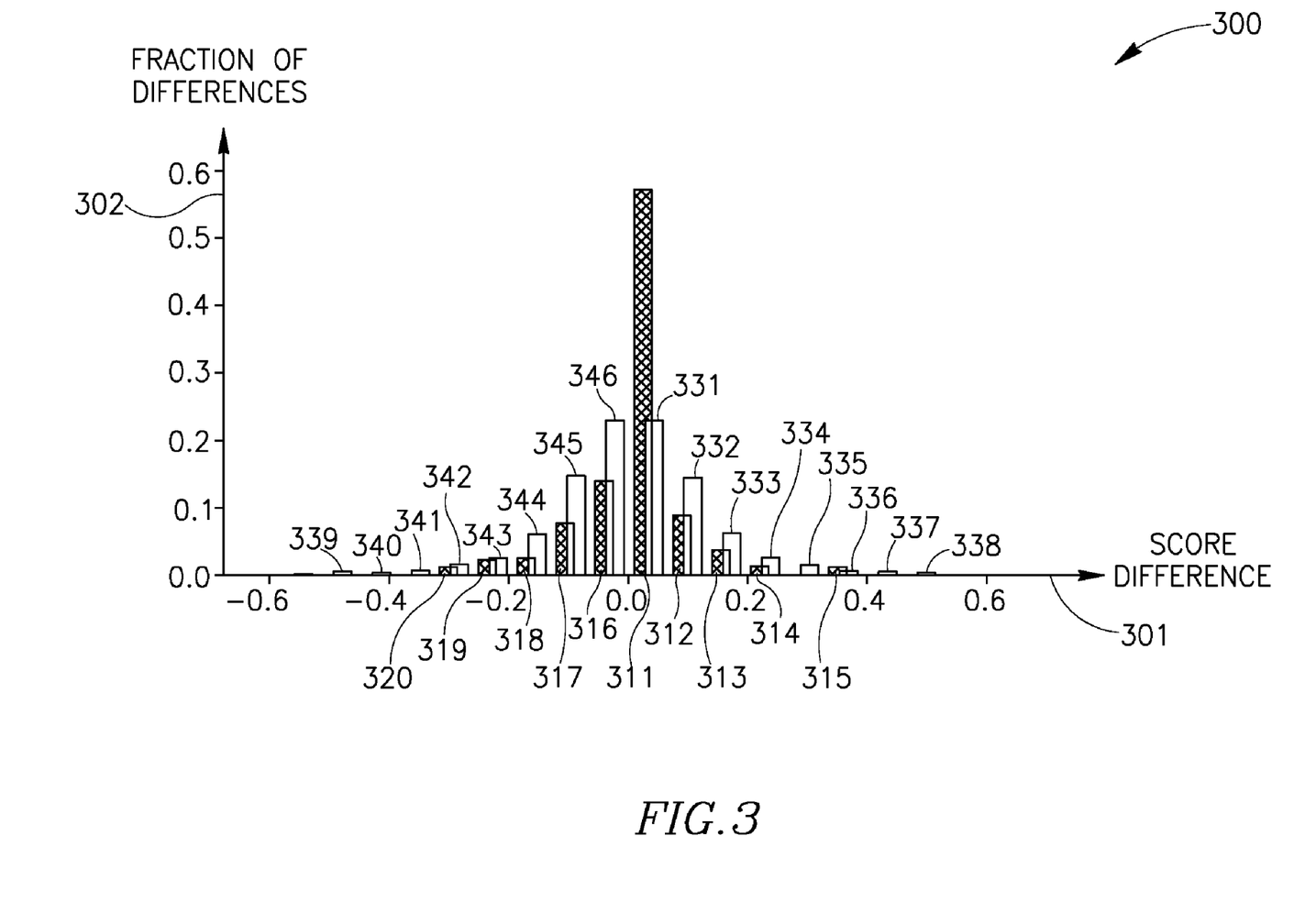
FIG. 3 is a schematic illustration of a score differences distribution chart generated in accordance with a demonstrative embodiment of the invention.

FIG. 3 schematically illustrates a score differences distribution chart 300 generated in accordance with some demonstrative embodiments of the invention. Chart 300 and/or the data reflected in chart 300 may be generated, for example, by system 100 of FIG. 1, by debugger 140 of FIG. 1, and/or by other suitable units, devices and/or systems.

In chart 300, a horizontal axis 301 indicates values of score differences, for example, associated with edges of a control flow graph, or associated with program code portions. A vertical axis 302 indicates the fraction (e.g., within a range of zero to one) of the differences having the corresponding value. For example, a bar 333 which is horizontally positioned at score difference value 0.18 and has a vertical height of 0.05, indicates that the score difference value of 0.18 is associated with 0.05 of all the calculated score differences (namely, that 5 percent of the calculated score differences have a value of 0.18).

Black bars 311-320 indicate score differences that were calculated between consecutive nodes along the program control flow graph (e.g., between node 216 and node 217 of FIG. 2, or between node 214 and node 215 of FIG. 2). The total height of all the black bars 311-320 is one.

In contrast, white bars 331-346 indicate score differences that were calculated between pseudo-random nodes of the program control flow graph, namely, nodes that are not necessarily consecutive (e.g., between node 216 and node 213 of FIG. 2, or between node 211 and node 215 of FIG. 2). The total height of all the white bars 331-346 is one.

In some embodiments, as illustrated schematically in FIG. 3, utilization of consecutive nodes for calculation of score differences may be more indicative than utilization of non-consecutive nodes (or pseudo-random nodes, or nodes that are not necessarily consecutive) for calculation of score differences. For example, with regard to bars that are closest to value of zero score difference, the black bar 311 corresponds to approximately 0.58 of the score differences, whereas the white bar 346 corresponds to approximately 23 percent of the score differences.

Figure 4:
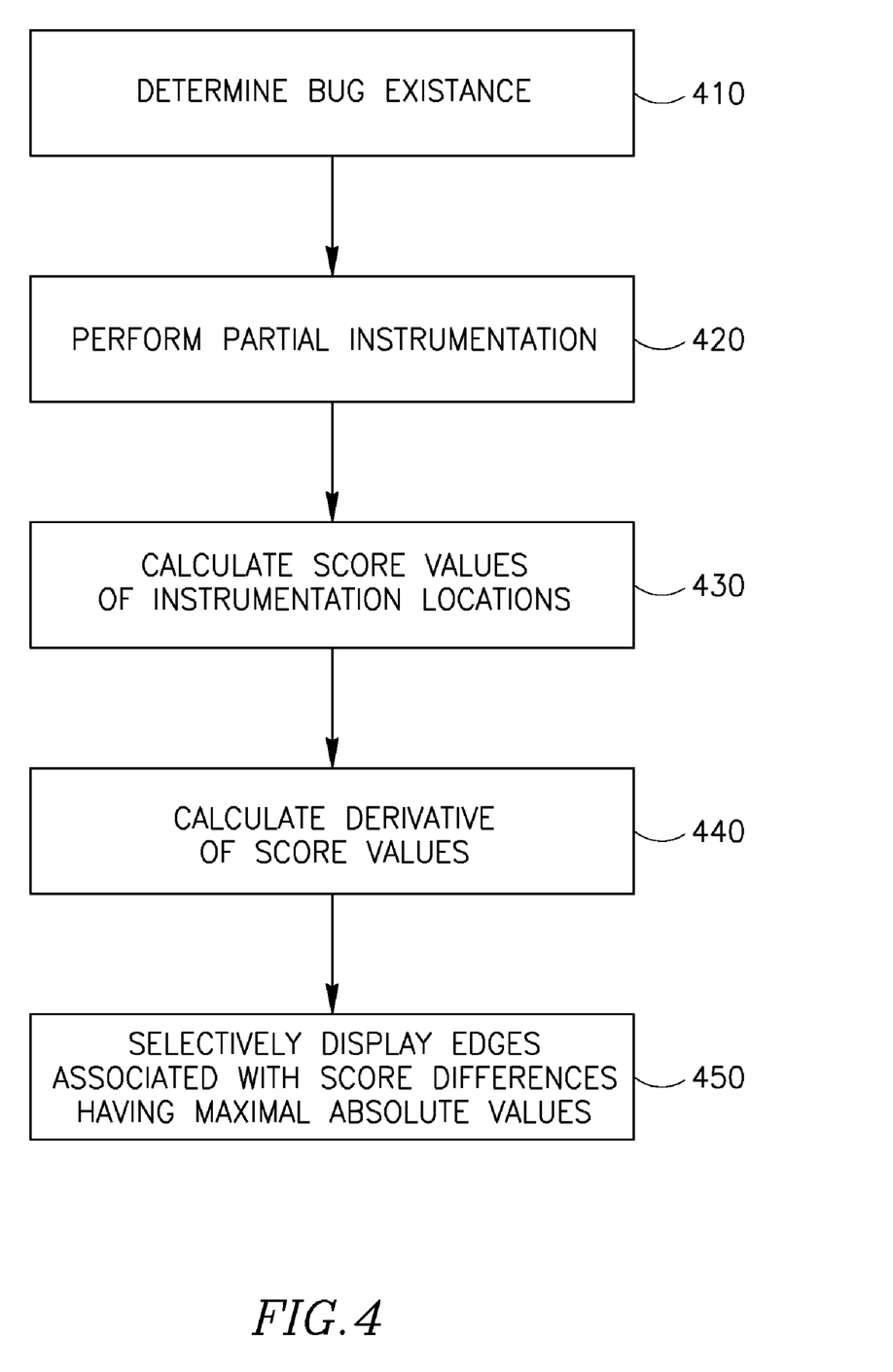
FIG. 4 is a schematic flow-chart of a method of debugging computer programs in accordance with a demonstrative embodiment of the invention.

FIG. 4 is a schematic flow-chart of a method of debugging computer programs in accordance with some demonstrative embodiments of the invention. Operations of the method may be used, for example, by system 100 of FIG. 1, by debugger 140 of FIG. 1, and/or by other suitable units, devices and/or systems.

In some embodiments, the method may include, for example, determining that a computer program includes a bug (block 410). This may be performed, for example, using a debugger tool utilizing timing instrumentation.

In some embodiments, the method may include, for example, performing partial instrumentation of the computer program (block 420), e.g., selective instrumentation of program locations that are possible candidates to elicit the bug, by noise injection.

In some embodiments, the method may include, for example, calculating score values corresponding to instrumentation locations (block 430). This may include, for example, repeated execution of the program, and division of the probability (or the number of runs) that a program location contributed to or induced the bug, by the probability (or the number of runs) that the program location did not contribute to or did not induce the bug.

In some embodiments, the method may include, for example, calculating a derivative (e.g., a difference, or other value indicative of a change) of the score values (block 440), e.g., score differences between pairs of consecutive instrumentation locations.

In some embodiments, the method may include, for example, selectively displaying edges associated with score differences having maximal absolute value(s) (block 450).

Other suitable operations or sets of operations may be used in accordance with embodiments of the invention.

Functions, operations, components and/or features described herein with reference to one or more embodiments, may be combined with, or may be utilized in combination with, one or more other functions, operations, components and/or features described herein with reference to one or more other embodiments, or vice versa.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for debugging computer programs, the method executed by a processor comprising: locating a bug in a computer program based on a first score corresponding to a first instrumentation location of the computer program and a second score corresponding to a second instrumentation location of the computer program, wherein the first score corresponding to the first instrumentation location and the second score corresponding to the second instrumentation location are obtained by repeatedly executing the computer program and the first and second instrumentation locations are distinct, wherein the first or the second score is calculated by an arithmetic operation on number of runs associated with the first or the second instrumentation location, respectively, in which the computer bug was revealed and number of runs in which the computer bug was not revealed, and wherein the first score indicates an estimated probability that the first program location induces the program bug, and the second score indicates an estimated probability that the second program location induces the program bug.

2. The method of claim 1, wherein the arithmetic operation is division.

3. The method of claim 1, wherein locating the bug comprises:

calculating an absolute value of a difference between the first score and the second score.

4. The method of claim 1, wherein locating the bug comprises:

calculating a plurality of score differences corresponding respectively to a plurality of pairs of consecutive instrumentation locations.

5. The method of claim 4, comprising:

selectively displaying one or more score differences having the greatest absolute values.

6. The method of claim 4, wherein locating the bug comprises:

determining one or more score differences that are significant to localizing the program bug; and selectively displaying the one or more score differences in proximity to edges of a control flow graph corresponding to a flow of the computer program.

7. The method of claim 1, comprising:

generating a control flow graph corresponding to a flow of the computer program; and selectively displaying one or more score differences associated with one or more edges of the flow control graph.

8. The method of claim 7, comprising: receiving a user selection of one of the edges of the control flow graph, said one of the edges having an entry node and an exit node; and displaying a program portion starting at a program location corresponding to the entry node and ending at a program location corresponding to the exit node.

9. A system for debugging computer programs, the system comprising:

a processor, a storage device, and a debugger executed by the processor for locating a bug in a computer program stored on the storage device, based on a first score corresponding to a first instrumentation location of the computer program and a second score corresponding to a second instrumentation location of the computer program, wherein the first score corresponding to the first instrumentation location and the second score corresponding to the second instrumentation location are obtained by repeatedly executing the computer program and the first and second instrumentation locations are distinct, wherein the first or the second score is calculated by an arithmetic operation on number of runs associated with the first or the second instrumentation location, respectively, in which the computer bug was revealed and number of runs in which the computer bug was not revealed, and wherein the first score indicates an estimated probability that the first program location induces the program bug, and the second score indicates an estimated probability that the second program location induces the program bug.

10. The method of claim 9, wherein the arithmetic operation is division.

11. The system of claim 9, wherein the debugger is to calculate an absolute value of a difference between the first score and the second score.

12. The system of claim 9, wherein the debugger is to calculate a plurality of score differences corresponding respectively to a plurality of pairs of consecutive instrumentation locations.

13. The system of claim 12, wherein the debugger is to selectively display one or more score differences having the greatest absolute values.

14. The system of claim 12, wherein the debugger is to determine one or more score differences that are significant to localizing the program bug, and to selectively display the one or more score differences in proximity to edges of a control flow graph corresponding to a flow of the computer program.

15. The system of claim 9, wherein the debugger is to generate a control flow graph corresponding to a flow of the computer program, and to selectively display one or more score differences associated with one or more edges of the flow control graph.

16. The system of claim 15, wherein the debugger is to receive a user selection of one of the edges of the control flow graph, said one of the edges having an entry node and an exit node, and to display a program portion starting at a program location corresponding to the entry node and ending at a program location corresponding to the exit node.

17. A computer program product comprising a storage media including a computer readable program, wherein the computer readable program when executed on a computer causes the computer to perform a method comprising:

locating a bug in a computer program based on a first score corresponding to a first instrumentation location of the computer program, and a second score corresponding to a second instrumentation location of the computer program, wherein the first score corresponding to the first instrumentation location and the second score corresponding to the second instrumentation location are obtained by repeatedly executing the computer program and the first and second instrumentation locations are distinct, wherein the first or the second score is calculated by an arithmetic operation on number of runs associated with the first or the second instrumentation location, respectively, in which the computer bug was revealed and number of runs in which the computer bug was not revealed, wherein the first score indicates an estimated probability that the first program location induces the program bug, and the second score indicates an estimated probability that the second program location induces the program bug, and wherein said computer readable program is stored on said storage media.

18. An apparatus for debugging a computer program, the apparatus comprising:

a processor, a storage device storing the computer program, and a debugger executed by the processor for calculating a first score corresponding to a first instrumentation location of the computer program and a second score corresponding to a second instrumentation location of the computer program, the first score corresponding to the first instrumentation location and the second score corresponding to the second instrumentation location are obtained by repeatedly executing the computer program and the first and second instrumentation locations are distinct, wherein the first or the second score is calculated by an arithmetic operation on number of runs associated with the first or the second instrumentation location, respectively, in which the computer bug was revealed and number of runs in which the computer bug was not revealed, wherein the first score indicates an estimated probability that the first program location induces the program bug, and wherein the second score indicates an estimated probability that the second program location induces the program bug;

a difference calculator to calculate an absolute value of a difference between the first score and the second score; and a difference selector to selectively display one or more score differences having the greatest absolute values out of a plurality of score differences corresponding respectively to a plurality of pairs of consecutive instrumentation locations.

* * * * *